United States Patent [19]

Saumweber et al.

[11] Patent Number: 4,466,066
[45] Date of Patent: Aug. 14, 1984

[54] ANTI-LOCKING BRAKE FORCE REGULATING DEVICE

[75] Inventors: Eckart Saumweber, Gauting; Heinrich Beckmann; Jens Ottersbach, both of Minden, all of Fed. Rep. of Germany

[73] Assignee: Knorr-Bremse GmbH, Munich, Fed. Rep. of Germany

[21] Appl. No.: 311,648

[22] Filed: Oct. 15, 1981

[30] Foreign Application Priority Data

Oct. 20, 1980 [DE] Fed. Rep. of Germany ....... 3039512

[51] Int. Cl.³ .............................................. B60T 8/02
[52] U.S. Cl. .................................... 364/426; 303/95; 303/96; 303/111
[58] Field of Search .......................... 303/95, 96, 111; 364/426

[56] References Cited

U.S. PATENT DOCUMENTS 3,930,688  1/1976  Rau et al. ................. 364/426 X
3,934,125  1/1976  Macamo .................... 364/426 X Primary Examiner—B. Dobeck
Assistant Examiner—Saul M. Bergmann
Attorney, Agent, or Firm—Edmund M. Jaskiewicz

[57] ABSTRACT

An anti-locking brake force regulating device for rail vehicles has a digital evaluation circuit which monitors the speed, acceleration and slip of at least one braked wheel and transmits braking instructions to a brake actuating element. The instructions include a rapid or slow increase or decrease of brake pressure or maintaining the brake pressure constant. In order to achieve a smooth control during a braking operation, the evaluation circuit is such that after instructing a rapid change of brake pressure in response to exceeding a predetermined threshold value a slow change of brake pressure in the same direction as the rapid change is instructed if the threshold value is again exceeded and the slow pressure change begins by a maintaining brake pressure constant phase. The slow or pulsed brake pressure change is preferably maintained for a fixed predetermined period of time.

6 Claims, 3 Drawing Figures

- — MAINTAIN PRESSURE
- ↑ RAPID INCREASE
- ↓ RAPID DECREASE
- ⌐↑ PULSED INCREASE BEGINNING WITH INCREASE
- ⌐↓ PULSED DECREASE BEGINNING WITH MAINTENANCE
- ↓⌐ PULSED DECREASE BEGINNING WITH DECREASE
- ⌐↑ PULSED INCREASE BEGINNING WITH MAINTENANCE

ANTI-LOCKING BRAKE FORCE REGULATING DEVICE

The present invention relates to an anti-locking brake force regulating device for rail vehicles and the like, more particularly, to the instructions transmitted by an evaluation circuit to a brake actuating element.

It is generally known to provide a brake force regulating device protected against locking for rail vehicles in which a wheel generator connected to a monitored wheel generates signals which are indicative of the rotational speed of the wheel. A digital evaluation circuit actuates at least one brake actuating element by means of brake pressure instructions transmitted in response to the output signals of the wheel generator when predetermined threshold values are exceeded. These instructions include a rapid or slow change in brake pressure or maintaining the brake pressure constant. The slow change of brake pressure results from a pulsating actuation of the brake actuation element so that alternating phases of rapid change in brake pressure and maintaining brake pressure constant occur.

Such brake force regulating devices have been provided commercially by the assignee of the instant application under the designation GR 5. In such a brake force regulating circuit, various signals are received in the evaluation circuit which are proportional to the rotary speed of the wheel, and may also include a reference signal simulating the vehicle speed, wheel acceleration or deceleration signals, difference signals between wheel speed signals and the reference signals and other signals depending upon the functions which are desired to be performed by the evaluation circuit. These individual signals are generally compared with one or more reference signals and in response to this comparison, instructions are transmitted to influence or regulate the right pressure.

The wheel generator which is presently used in such brake force regulating circuits comprises a so-called pulse transducer in which a toothed wheel rotating synchronously with the monitored wheel of the vehicle is sensed magnetically or optically to generate a pulse-type output signal which has a frequency proportional to the rotational speed of the wheel. This output signal which may be subjected to frequency multiplication, is generally supplied into a counter during fixed cycle times so that at the end of a time cycle or interval of time the content of the counter corresponds to the wheel speed during that time period. If a binary counter should be used, the measured value is correspondingly binary coded. The other mentioned signals which are supplied to the evaluation circuit are then derived in a conventional manner as known in the art from successive measured values.

However, in the above-described type of measurement, it is inevitable that various errors occur. First, there are unavoidable errors in computing and digitizing. Further, changes in the wheel speed cannot be completely and accurately sensed during the time measurement interval since the counting of pulses results in only an average quantity. When there is a linear change of the measurement magnitude in rotary wheel speed in the present instance during the time measurement interval, the result registered by the counter at the end of the time measurement interval corresponds exactly to the arithmetic average of the measurement magnitude during the measurement interval. It is thus apparent that the magnitude of the wheel speed obtained as a measurement value at the end of a time measurement interval and also any other magnitudes derived from the wheel speed will lag behind the actual values indicating the behavior of the motion of the wheel. It is further apparent that any regulation of the wheel behavior as a result of prior braking instructions or prior influences on brake pressure are also sensed later than what they actually occur at the wheel.

A measure or instruction for the influencing of brake pressure derived on the basis of the sensed variation of the wheel behavior must then be relatively large in order to achieve the shortest possible braking path. This has the undesired consequence that the regulation of brake pressure operates roughly in that the brake force regulating circuit response frequency of that the brake pressure at any given time frequently changes.

It is therefore the principal object of the present invention to provide a novel and improved anti-locking brake force regulating device for rail vehicles and the like.

It is another object of the present invention to provide a brake force regulating device which protects against locking for vehicles which provides for a smooth control behavior while at the same time provides for a relatively short braking path.

According to one aspect of the present invention an anti-locking brake force regulating device for rail vehicles and the like may comprise a digital evaluation circuit which is responsive to the wheel speed of the vehicle and to other predetermined threshold values. This evaluation circuit transmits braking pressure instructions to the brake actuating element on the vehicle. These instructions essentially comprise a rapid change of brake pressure, a slow change of brake pressure and maintaining the brake pressure constant. According to the present invention, the instructions are such that after instructing a rapid change of brake pressure in response to exceeding a predetermined threshold value a slow change of brake pressure in the same direction as the rapid change is instructed if the threshold value is again exceeded and the slow pressure change is begun by a phase during which the brake pressure is maintained constant. The result is a smoother control behavior of the braking operation while at the same time protecting against locking.

According to the present invention, if the angular acceleration of the wheel falls below a predetermined negative threshold value (in the strictly mathematical sense) so as to indicate an impending danger of locking, and based upon this detected wheel acceleration a rapid reduction of brake pressure is ordered by the evaluation circuit, it can be concluded that there is a high probability that the reduction in brake pressure was successful and that the danger of locking of the wheel is no longer present should this threshold value be again exceeded. Under such circumstances, there is then a switch over from "rapid reduction in brake pressure" to "slow reduction in brake pressure" which latter instruction is begun with a phase during which brake pressure is maintained constant. During this phase of maintaining the brake pressure constant, which preferably corresponds to a predetermined number of cycles of the digital evaluation circuit, a measured value for the actual behavior of the wheel can then be obtained. The evaluation circuit can then detect with certainty at this time whether the rapid reduction in brake pressure was sufficient. It should be borne in mind that the corresponding statement is also true for a rapid increase in brake pressure when there is a further increase in the acceleration of the wheel. After this one phase of slow brake pressure change has been completed, in most cases a further criterion or threshold value of the evaluation circuit will be triggered which will bring about a corresponding effect on the brake pressure. It is preferable that the phase of slow brake pressure change consists of a phase of maintaining brake pressure constant for a duration of two cycle times and an actual change in brake pressure for a duration of one cycle time of the digital evaluation circuit.

Other objects and advantages of the present invention will be apparent upon reference to the accompanying description when taken in conjunction with the following drawings which are exemplary, wherein.

Proceeding next to the drawings wherein like reference symbols indicate the same parts throughout the various views a specific embodiment and modifications of the present invention will be described in detail.

Figure 1:
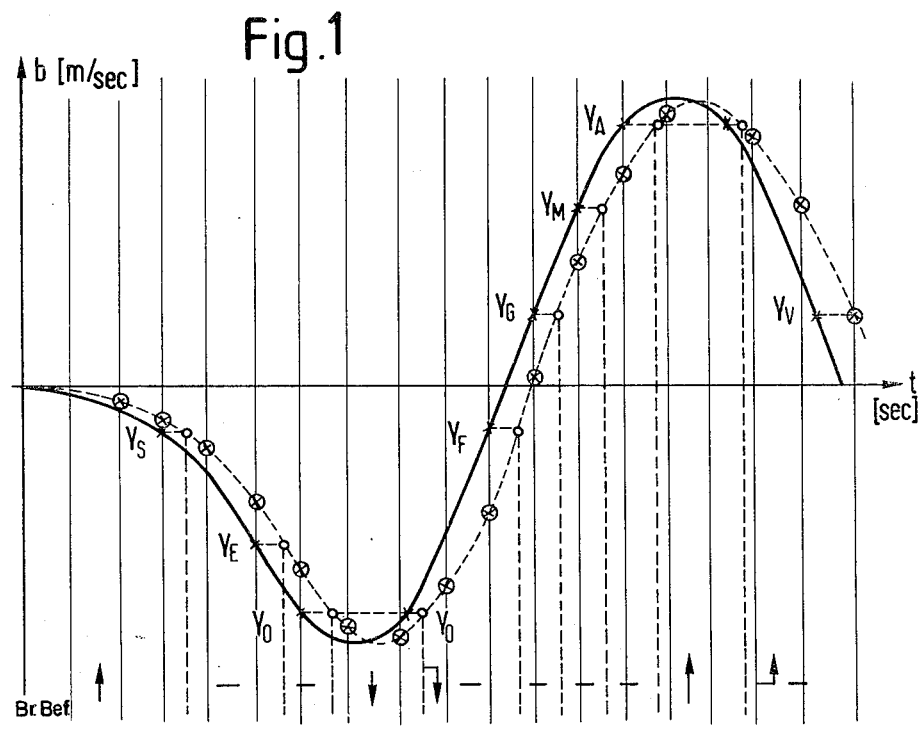
FIG. 1 is a graph showing the angular acceleration of the wheel with respect to time during a braking cycle.

In FIG. 1, the actual angular acceleration of a monitored wheel of a vehicle during a braking operation is shown as a solid line. The time measurement intervals illustrated between the individual thin vertical lines on the graph correspond to the cycle times of the digital evaluation circuit. Because of the measurement errors as described above, at the end of each respective measurement time interval, there is measured not the actual value of the angular acceleration but approximately the average value of the angular acceleration occuring throughout the preceding time measurement interval. These average values of the respective time measurement intervals are indicated by the small x's which are connected by a dashed curve to show schematically the course of the angular acceleration of the wheel as obtained from the evaluation circuit. The dashed curve is displaced in phase relationship with respect to the actual acceleration and the magnitude of the phase displacement depends on the angle of incline or magnitude of change of the actual wheel acceleration. The magnitudes of acceleration $Y_S$, $Y_E$, $Y_O$, $Y_F$, $Y_G$, $Y_M$ and $Y_A$ indicate the individual threshold values of angular acceleration at which corresponding braking instructions are released or initiated. The dashed horizontal lines from the threshold values indicate the lagging time period that the individual brake pressure instructions are initiated, or by what lagging time period the result of the brake pressure instructions carried out is detected by the evaluation circuit. Along the bottom of FIG. 1 are indicated the individual braking pressure instructions which are released in response to the individual criteria of threshold values. These instructions are shown in greater detail in the chart of FIG. 2.

Figure 2:
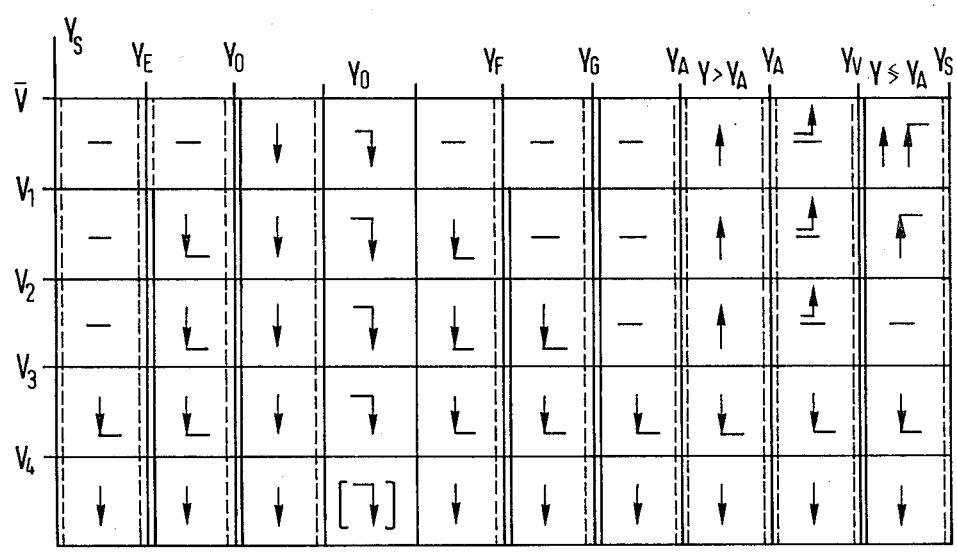
FIG. 2 is a chart illustrating brake pressure instructions in response to different release criteria or threshold values.

In FIG. 2, the individual horizontal rows correspond to predetermined ranges of speed of the monitored wheel and the value $\overline{v}$ indicates the theoretical vehicle speed discussed above. Certain predetermined speed ranges for the rotary speed of the wheel are indicated at $v$-$v_1$, $v_1$-$v_2$, $v_2$-$v_3$, $v_3$-$v_4$ and $v_4$-zero; "zero" indicates the wheel is at a standstill. The individual vertical columns indicate the individual acceleration ranges which are established by the threshold values shown in FIG. 1.

Thus, the state of a wheel with respect to its rotary speed and angular acceleration can be precisely associated with a particular square or block in FIG. 2. The braking instructions corresponding to each individual square on chart FIG. 2 are indicated symbolically and the individual symbols are explained in the legend below the chart in FIG. 2. Laterally on each individual field or square of FIG. 2 are either dashed or full lines. A dashed line indicates that the evaluation circuit is able to change over to the corresponding instruction of the field adjacent to and bordering the dashed line as long as the corresponding criteria are fulfilled. The full line means that the evaluation circuit cannot change over to the corresponding neighboring square.

In order to faciliate the comprehension of FIG. 2 as applied to the present invention, a possible course of braking may be illustrated as an example. For this particular example, the second horizontal row will be considered in which the wheel speed is in the range $v_1$-$v_2$. After an initial increase in braking pressure at the beginning of the braking operation, the monitored wheel will begin to slip so that the speed of the wheel is smaller than the theoretical vehicle speed and the wheel speed will lie in the speed range $v_1$-$v_2$. As soon as the wheel angular acceleration (deceleration) has reached a negative threshold value, $Y_S$ (See FIG. 1) the wheel pressure existing at the instant that this threshold value is reached will be maintained. If the wheel acceleration continues to decrease and reaches the (negative) threshold $Y_E$, the brake pressure will be slowly or pulsatingly reduced. Accordingly, the phase of maintaining brake pressure constant and slowly reducing the brake pressure will alternately follow each other and beginning with a brake pressure reduction phase. If the wheel acceleration continues to decrease and now reaches the (negative) threshold value $Y_O$, the brake pressure is rapidly decreased, i.e., without pulsing. If, after this rapid decrease of brake pressure, the threshold value $Y_O$ is again exceeded by the wheel acceleration increasing and now moving in an upward direction on the curve, there will be a changeover for a predetermined time period to a slow or pulsed reduction of pressure beginning with a phase of maintaining the brake pressure constant. After this time period has expired, the brake pressure is further slowly reduced, i.e., pulsing, with this instruction being indicated as "pulsed decrease beginning with decrease" for distinction from the instruction which it subsequently follows. If the acceleration of the wheel should then continue to increase so as to exceed or pass the next threshold value $Y_F$, there is a changeover in instructions to maintaining brake pressure constant. This instruction is also retained in the following acceleration range of $Y_G$-$Y_A$. If the wheel acceleration should exceed the threshold $Y_A$, there will be a changeover in instruction to a rapid increase of braking pressure, i.e., unpulsed. When the threshold $Y_A$ is again exceeded, as the wheel acceleration begins to decrease as shown on the curve in FIG. 1, there will be a changeover for a predetermined period of time to the instruction "pulsed increase, beginning with maintaining pressure constant." Upon the expiration of this time interval, there will then be a changeover of instruction to maintaining pressure constant.

If the angular acceleration of the wheel then reaches the threshold value $Y_V$, there is then a changeover instruction to a pulsed or slow pressure increase.

It is apparent that not all of the fields or square of a horizontal line in a speed range are successively passed through in practice. Since a new instruction can be transmitted by the evaluation circuit only after a given time cycle, it is possible that with a large change of wheel acceleration during the preceding time measurement interval, several vertical columns in FIG. 2 are passed so that individual squares in a horizontal line are skipped.

It should also be borne in mind that the rotary speed of a wheel can vary during a braking cycle so that the logic jumps to another horizontal line indicating another speed range of FIG. 2. It is of course possible that the change in wheel speed and acceleration can occur in such a manner that there are simultaneous changes in vertical columns and horizontal rows so that diagonal jumps can occur in the diagram of FIG. 2.

A special feature of the invention is represented in that situation in which the wheel speed is in the range between $v_4$ and zero. The instruction indicated in parenthesis when the acceleration threshold $Y_O$ is again exceeded, can also be replaced by the instruction "unpulsed reduction" since at the low wheel speeds occurring in this speed range, the danger of locking is too great to permit a phase of maintaining the brake pressure constant.

Figure 3:
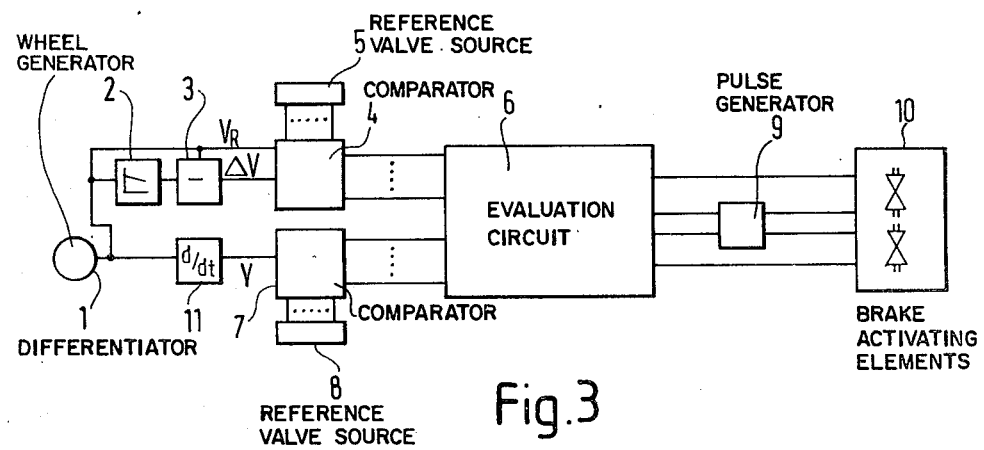
FIG. 3 is a block circuit diagram showing schematically the brake pressure regulating circuit of the present invention.

In the brake force regulating circuit, according to the present invention, as shown in FIG. 3, a wheel generator 1 emits coded pulses which are proportional to the rotational speed of the wheel and these pulses are supplied to a circuit 2 in which a signal simulating the vehicle speed (so-called theoretical speed) is conventionally produced such as, for example, by means of capacitor discharge. This signal is then supplied to the input of a difference circuit 3 which has a second input to receive the output signal of the wheel generator 1. There thus appears at the output of the difference curcuit 3 a signal proportional to the difference between the actual wheel speed and theoretical vehicle speed. This signal is generally indicated by a$\Delta v$ signal which is supplied together with the output signal of the wheel generator 1 to a comparator 4 where the signal is compared with predetermined threshold values from a reference value source 5. The predetermined threshold of the reference value source 5 correspond to the speed signals $V_1$ through $V_4$ described above in conjunction with FIG. 2 and to the value "zero". The signals which then appear at the corresponding output of the comparator 4 indicate the individual speed ranges of FIG. 2. These signals are supplied to an evaluation circuit 6.

The output signal of the wheel generator 1 is also supplied to a differentiator 11 at the output of which appears a signal Y proportional to the wheel acceleration or to the angular acceleration of the wheel. The signal from differentiator 11 is then supplied to a further comparator 7 where it is compared with threshold values from a further reference value source 8. The predetermined threshold values of the reference value source 8 correspond to the acceleration of threshold values $Y_S$, $Y_E$, $Y_O$, $Y_F$, $Y_G$, $Y_M$, $Y_A$ and $Y_V$ of FIGS. 1 and 2. Signals then appear at the corresponding outputs of the comparator 7 which indicate the acceleration region (the vertical columns in FIG. 2) in which the monitored wheel is located. These signals are similarly supplied to the evaluation circuit 6.

The evaluation circuit 6 performs the logical operations illustrated in the diagram of FIG. 2 and emits at its outputs instruction signals corresponding to FIG. 2 which are fed to brake actuating elements 10 either through a pulse generator 9 or directly according to the precise instruction. The brake actuating elements 10 generally comprise electrically actuated valves as known in the art comprising generally an inlet valve and an outlet valve.

The mode of operation of the evaluation circuit in conjunction with the chart of FIG. 2, particularly with the use of a microprocessor, is evident to one skilled in the art and it is not considered necessary to describe in further detail the precise operation of the evaluation circuit.

Thus it can be seen that the present invention has provided a brake force regulating device or circuit for vehicles which provides for a smoother control during the braking operation while at the same time provides for a shorter braking path or braking distance and also protects the braking system against locking.

It will be understood that this invention is susceptible to modification in order to adapt it to different usages and conditions, and accordingly, it is desired to comprehend such modifications within this invention as may fall within the scope of appended claims.

What is claimed is:

1. An anti-locking brake force regulating device for rail vehicles and the like comprising means responsive to a wheel of a vehicle for generating a signal indicative of the wheel speed, a digital evaluation circuit responsive to said wheel speed signal and to predetermined threshold values for transmitting braking pressure instructions to a brake actuating element, said instructions comprising rapid change of brake pressure, slow change of brake pressure and maintaining brake pressure constant said instructions being such that after instructing a rapid change of brake pressure in response to exceeding a said predetermined threshold value a slow change of brake pressure in the same direction as said rapid change is instructed if the said threshold value is again exceeded and said slow pressure change is initiated by a maintaining brake pressure constant phase whereby a smoother control behavior of the braking operation while protecting against locking is achieved.

2. An anti-locking brake force regulating device as claimed in claim 1 wherein such low change of brake pressure beginning with the maintaining brake pressure constant phase is carried out during a predetermined time interval.

3. An anti-locking brake force regulating device as claimed in claim 2 wherein said time interval corresponds to a predetermined number of cycles of said digital evaluation circuit.

4. An anti-locking brake force regulating device as claimed in claim 1 wherein the time relation of the maintaining brake pressure constant phase to the changing brake pressure phase in a slow change of brake pressure is predetermined and fixed.

5. An anti-locking brake force regulating device as claimed in claim 1 wherein the ratio of the maintaining brake pressure constant phase to the changing brake pressure phase is 2 : 1.

6. An anti-locking brake force regulating device as claimed in claim 1 wherein the slow brake pressure change following a rapid brake pressure change occurs only following a rapid decrease in brake pressure.

* * * * *